(12) United States Patent
d'Alayer de Costemore d'Arc

(10) Patent No.: US 7,150,027 B2
(45) Date of Patent: Dec. 12, 2006

(54) TRANSFER DEVICE FOR INFORMATION CARRIERS

(75) Inventor: Stéphane Marie André d'Alayer de Costemore d'Arc, Genappe (BE)

(73) Assignee: Staar S.A., Brussels (BE)

( * ) Notice: Subject to any disclaimer, the term of this patent is extended or adjusted under 35 U.S.C. 154(b) by 179 days.

(21) Appl. No.: 10/519,658

(22) PCT Filed: Dec. 10, 2003

(86) PCT No.: PCT/BE03/00215

§ 371 (c)(1),
(2), (4) Date: Dec. 23, 2004

(87) PCT Pub. No.: WO2004/055805

PCT Pub. Date: Jul. 1, 2004

(65) Prior Publication Data

US 2005/0249102 A1    Nov. 10, 2005

(30) Foreign Application Priority Data

Dec. 18, 2002 (BE) ............................ 2002/0736

(51) Int. Cl.
*G11B 17/04* (2006.01)
(52) U.S. Cl. .................................................. 720/656
(58) Field of Classification Search ................ 720/656, 720/619–625, 645
See application file for complete search history.

(56) References Cited

U.S. PATENT DOCUMENTS

| | | | |
|---|---|---|---|
| 5,764,612 A * | 6/1998 | Tanaka et al. | 720/623 |
| 5,867,338 A | 2/1999 | Ohira | |
| 5,914,929 A * | 6/1999 | Kato et al. | 720/656 |
| 6,377,538 B1 | 4/2002 | D'Alayer | |
| 2003/0103434 A1* | 6/2003 | Kuo | 369/77.1 |

FOREIGN PATENT DOCUMENTS

| | | | |
|---|---|---|---|
| EP | 1087388 A1 | | 3/2001 |
| JP | 2002170305 A | * | 6/2002 |
| JP | 2002358710 A | * | 12/2002 |

* cited by examiner

Primary Examiner—William J Klimowicz
(74) Attorney, Agent, or Firm—Leydig, Voit & Mayer, Ltd.

(57) ABSTRACT

A transfer device is provided that ensures transfer of information carriers of different dimensions due to a single loading device including a detection mechanism means (32) associated with linking elements (40). Upon the insertion of an information carrier, the linking elements (40) cooperates with a projection (50A, 50B) set in relation with the size of the inserted information carrier. The projection is supported by a slider (52) that actuates clamping and driving mechanisms to ensure the setting of the inserted information carrier in its operative position. Thus, the synchronization between the clamping and driving mechanisms is made in relation with the size of said carrier.

9 Claims, 4 Drawing Sheets

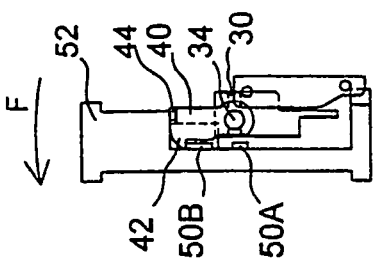
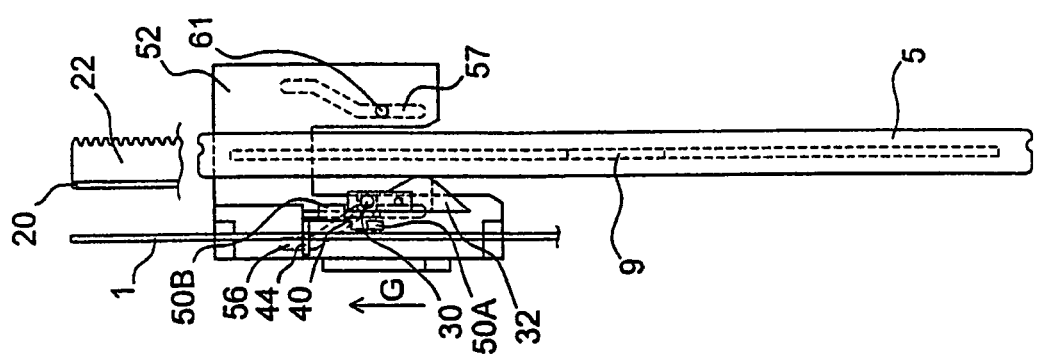
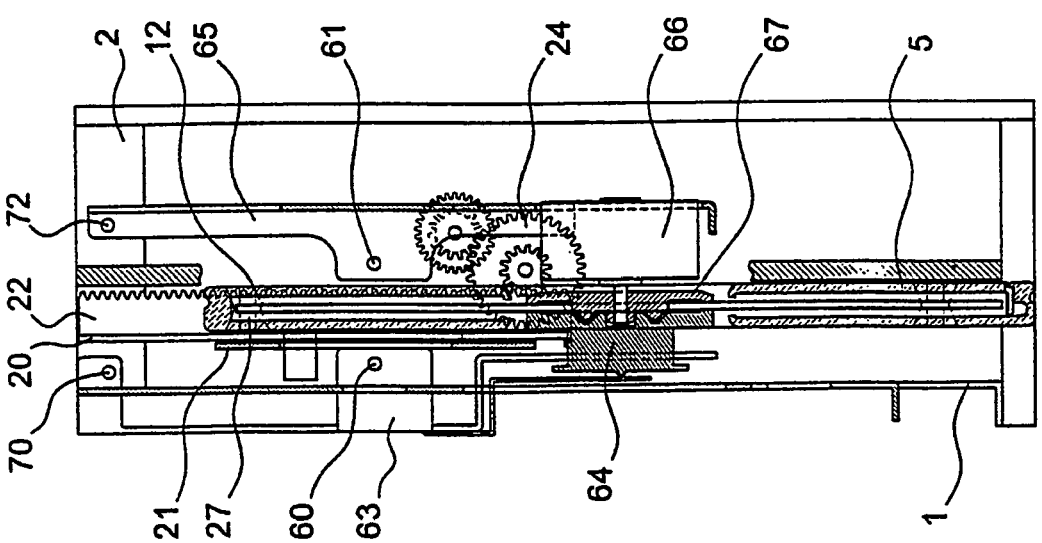

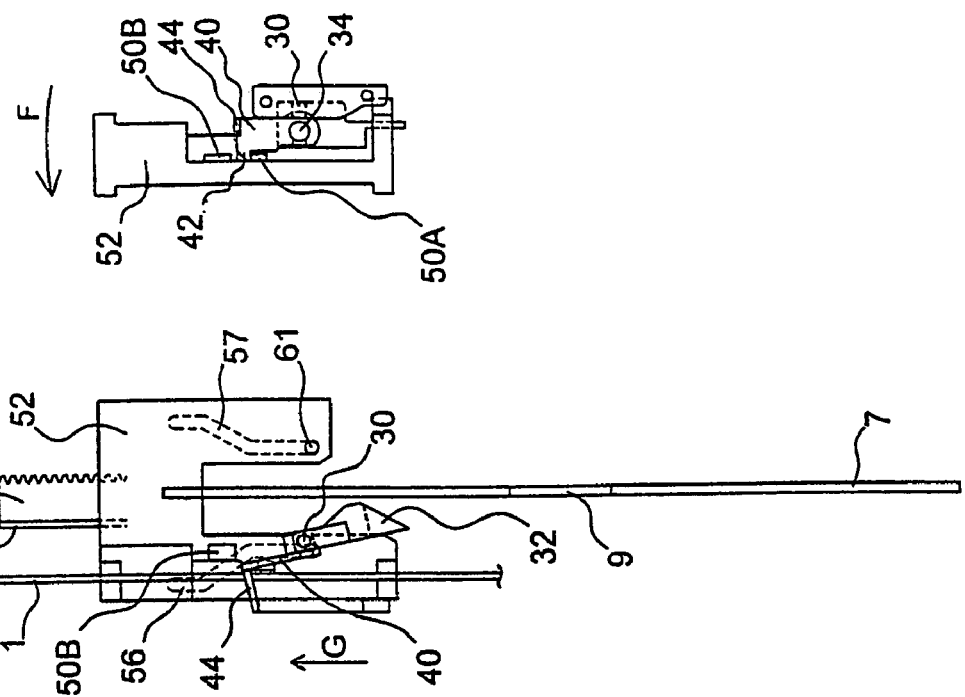
FIG.6A
FIG.6
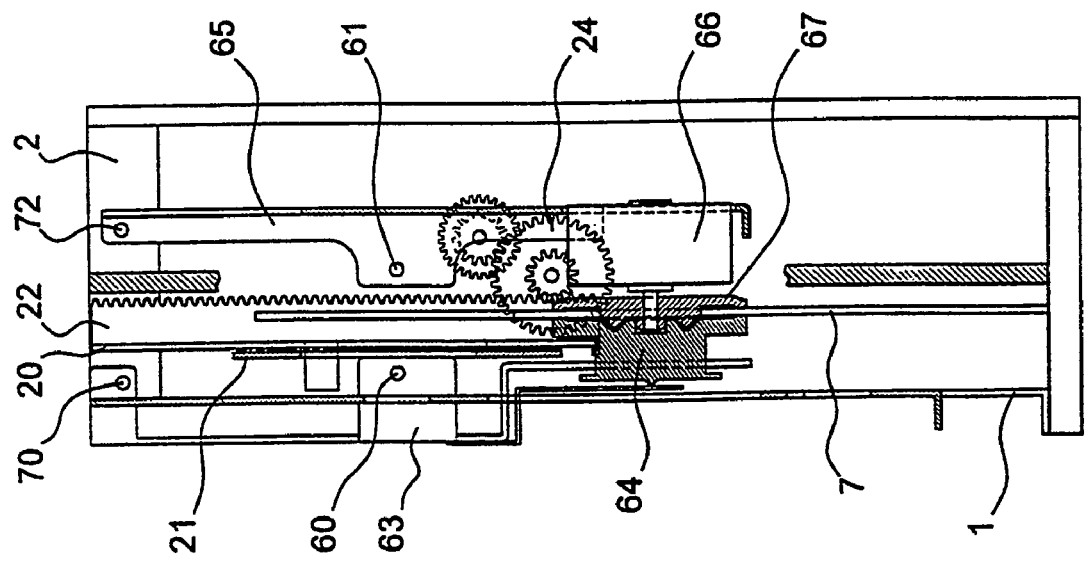
FIG.5

TRANSFER DEVICE FOR INFORMATION CARRIERS

FIELD OF THE INVENTION

The present invention relates to transfer devices ensuring the loading/unloading of information carriers in/from record and/or playback apparatuses and particularly to such devices for information carriers of a substantially circular periphery such as optical, magnetic discs, CD, DVD. The present invention relates more particularly to transfer devices for those information carriers appearing in two configurations different in size and/or thickness as, for instance, bare discs and discs housed in protective cartridges such as the one disclosed in U.S. Pat. No. 6,377,538, which is assigned to the same assignee as the present invention.

BACKGROUND OF THE INVENTION

Transfer devices have been developed for information carriers of different configurations. For example, the transfer devices disclosed in U.S. Pat. No. 5,867,338 and EPA 1.087.388 ensure the loading of bare discs and cartridges holding discs. However, these devices involve either elements selected by the user himself before he inserts the carrier (U.S. Pat. No. 5,867,338) or a loading mechanism adapted to each type of carrier (EPA 1.087.388), for instance one loading mechanism for bare discs and another loading mechanism for discs housed in cartridges. Such devices are thus complex, expensive and require a lot of space.

SUMMARY OF THE INVENTION

The aim of the present invention is to overcome the above-mentioned drawbacks by providing a single, simple, low cost, reliable, compact device that ensures the transfer of information carriers having substantially the same profile, but having configurations different in size and/or thickness, by adapting, during said transfer, simultaneously and automatically the driving and clamping mechanisms of the apparatus to the inserted information carrier.

A further aim of the invention is to utilize, by controlling them differently, mechanisms already provided in transfer devices to limit the increase of parts, the additional cost, the overall height and the required space.

Another aim of the invention is to avoid requiring any specific manipulation/selection by the user before he inserts a carrier into the apparatus.

Further characteristics, advantages, particularities of the invention will appear from the preferred embodiment, hereafter described in a non-limiting way and to which further improvements, modifications can be brought without departing from the scope of the invention, in conjunction with the drawings for which:

BRIEF DESCRIPTION OF THE DRAWINGS

FIG. 3 is a partial cross-sectional view of the apparatus of FIG. 1 taken in the plane of line A—A of FIG. 1.

FIG. 4 is a simplified drawing of the cross-sectional view of FIG. 3 in which only the key elements of the transfer device are shown.

FIG. 4A is a top view of a portion of the linking element and slider shown in FIG. 4.

FIG. 5 is a cross-sectional view similar to the view of FIG. 3 of an apparatus and transfer device configured to handle a bare disc.

FIG. 6 is a simplified cross-sectional view similar to FIG. 3 of the apparatus and transfer device of FIG. 5.

FIG. 6A is a top view of a portion of the linking element and slider shown in FIG. 6 (similar to FIG. 4A).

For clarity and simplicity purposes, only the elements strictly necessary for the understanding of the invention appear on each figure.

DETAILED DESCRIPTION OF THE INVENTION

In the illustrated embodiment, the information carrier is a standard optical disc such as a CD, DVD, etc. also called a compact disc, digital video disc, used either bare (for carriers having a small thickness) or enclosed in a cartridge (for carriers having different dimensions such as a thickness and diameter larger than those of a bare disc) similar to the cartridge described in U.S. Pat. No. 6,377,538, which is assigned to the same assignee as the present invention.

Figure 1:
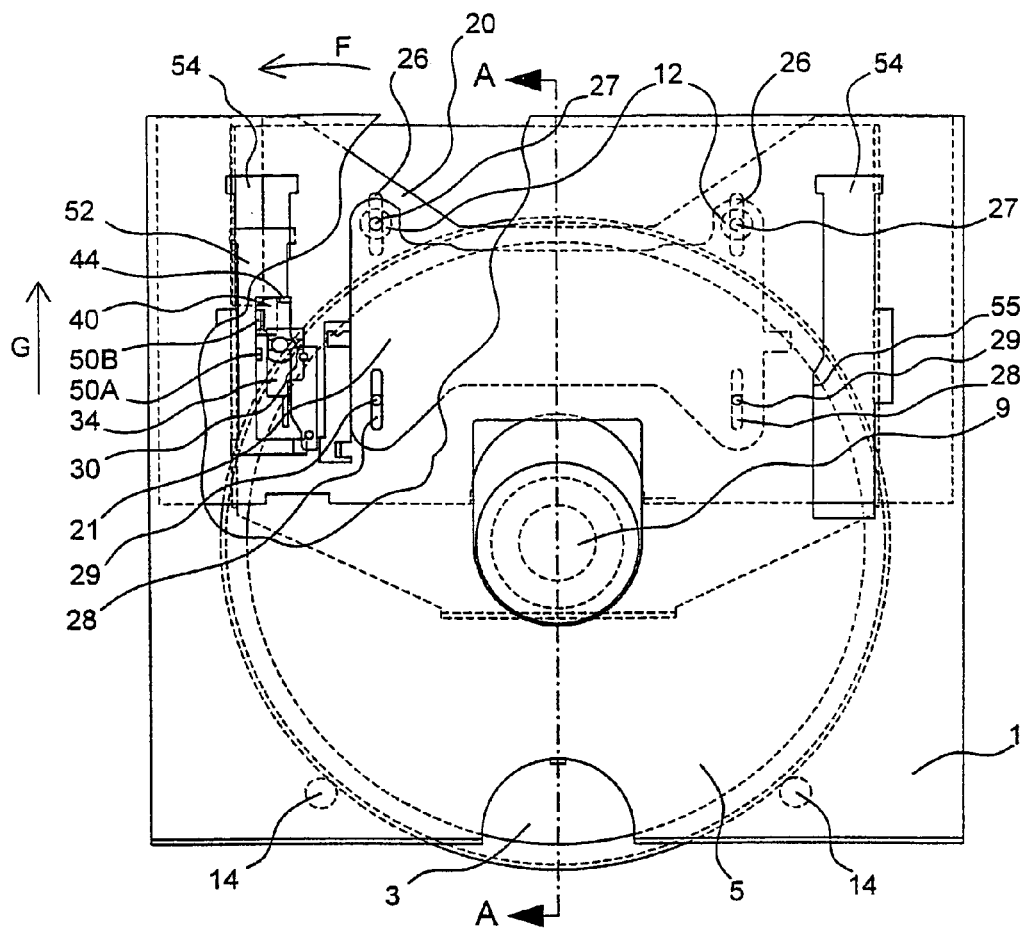
FIG. 1 is a schematic top view of an exemplary apparatus incorporating a transfer device according to the present invention with a portion of the frame being cut away for clarity and the apparatus being in the operative playback position for a disc housed in a cartridge.
Figure 7:
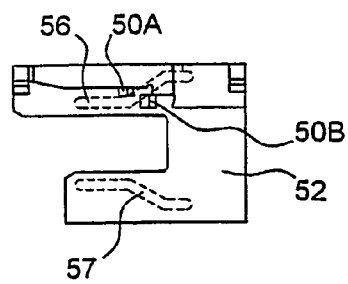
FIG. 7 is a view of a slider of a transfer device according to the invention.
Figure 8:
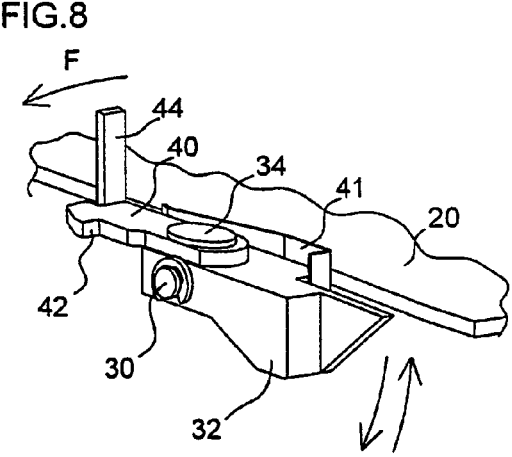
FIG. 8 is a perspective view of a linking element of a transfer device according to the invention.
Figure 2:
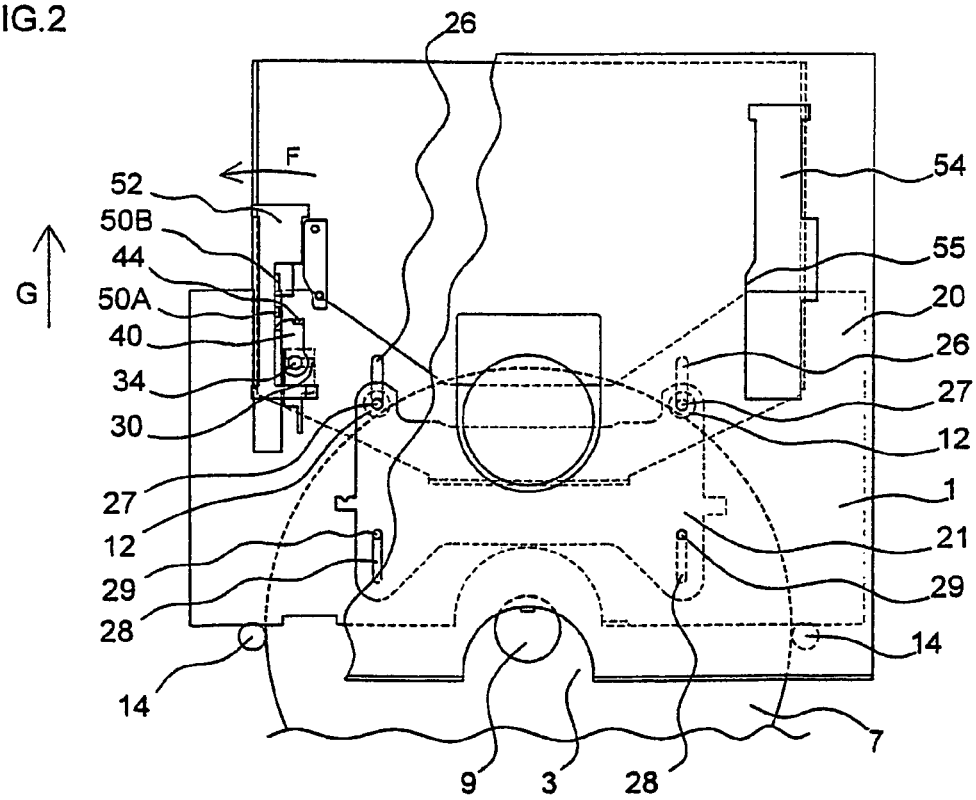
FIG. 2 is a partial top view of the apparatus of FIG. 1A with the apparatus being in its inoperative position of ejection/insertion.

Turning to the figures, the apparatus incorporating the transfer device comprises a fixed frame 1 provided with a semi-circular opening 3 allowing an easy pick-up of an information carrier 5, 7 by its central hole 9 in the eject position (FIG. 2). The apparatus comprises notably two pairs of mobile rollers 12, 14 having V-shaped profiles powering an appropriate centering of the information carrier 5, 7 during its transfer. The rollers 12, 14 are not essential elements for understanding the invention, and thus they appear schematically in the drawings. By the way, any other centering mechanism could be utilized. The transfer device includes a mobile frame 20 bearing a rack 22 (FIGS. 3 to 6) powered by a micro-motor (not shown) through a gear train 24. This mobile frame 20 supports a sub-frame 21 that also is mobile thanks to the combination, on one hand, of grooves 26 provided in the frame 20 and shafts 27 set on the sub-frame 21 (the shafts 27 bearing one pair of rollers 12) and on the other hand, of grooves 28 provided in the sub-frame 21 and studs 29 set on the frame 20. The mobile frame 20 bears laterally a pair of support elements 30, such as shafts (only the left one is shown) around which a detection mechanism can move, in this case pivot, such as feelers 32 (FIGS. 4, 6, 8) provided with resilient elements (not shown), urging them to pivot anti-clockwise. Each feeler 32 bears a shaft 34 around which linking elements 40, such as a ratchet, can rotate under the action of a resilient element 41, such as a leaf spring, urging a pivotal movement in the direction of the arrow F (FIGS. 1 to 2, 4A, 6A, 8). So, the detection elements or feelers 32 may pivot in a substantially vertical plane while the linking elements or ratchets 40 may pivot in plane different from that of the feelers 32, in this case in a substantially perpendicular plane. The ratchets 40 bear a profile 42 at one of their ends. The profile 42 is shaped as a hook (FIGS. 4A, 6A, 8) that cooperates with discontinuities such as projections 50A, 50B (FIGS. 4, 6, 7) that, preferably and for the simplicity of the device, are integral with sliders 52 (only the left one is shown) supported and guided by openings 54 provided in the fixed frame 1 (FIG. 1). The projections 50A, 50B are set at spaced-apart positions or levels (FIG. 7).

Each slider 52 bears two grooves 56, 57 (FIG. 7) on the external side opposite to that bearing the projections 50A, 50B. The grooves 56, 57 have a S-shaped profile for guiding studs 60, 61 (FIGS. 3, 4, 5, 6), respectively supported by a clamping mechanism 63, utilizing for instance a magnet 64 (FIGS. 3, 5), by a driving mechanism 65, including for instance a motor 66 bearing a turntable 67 supporting the information carrier 5, 7. The clamping and driving mechanisms pivot around fixed shafts 70, 72 supported by the lateral sides 2 of the apparatus. So, during the loading of the support, each slider 52, while moving longitudinally, ensures that the clamping 63 and driving 65 mechanisms pivot around their shafts 70, 72 to clamp and drive the information carrier 5, 7 when it is to be set in operative position, whether said carrier is a bare disc 7 or a cartridge 5 (FIGS. 3, 5). Upon ejection of the information carrier 5, 7, the sliders 52 ensure the pivoting of the clamping 63 and driving 65 mechanisms in the opposite direction to move them away from the carrier and thus allow its transfer to its inoperative position of ejection/insertion. Of course, one can imagine that only one of the clamping and driving mechanisms is movable as it is their relative movement which sets the information carrier 5, 7 in its operative, inoperative positions.

The ratchets 40 and projections 50A, 50B on the sliders 52 synchronize the mobile frame 20 powered by the rack 22 with the means setting the operative position, for instance the clamping 63 and driving 65 mechanisms such as disclosed hereafter.

Upon the loading of an information carrier 7 having a small thickness—for example a bare disc—the feelers 32 (FIG. 6) remain at their lower level under the action of their resilient elements, a level at which they do not enter into contact with the surface of the information carrier 7 while the ratchets 40 are thus at their higher position. So, the hooks 42 cooperate with the projections 50A (FIGS. 6, 6A) to connect the movement of each slider 52 to that of the rack 22 and the mobile frame 20.

During the loading of an information carrier 5 having a larger thickness—for example a cartridge—said carrier encounters the feelers 32 which then pivot around their shaft 30 against their resilient elements (FIG. 4) to move the ratchets 40 downwards and thus force their hooks 42 to cooperate with the projections 50B (FIGS. 4, 4A) in order to connect the movement of each slider 52 to that of the rack 22 but with a delay as compared to an information carrier 7 having a small thickness.

Figure 1A:
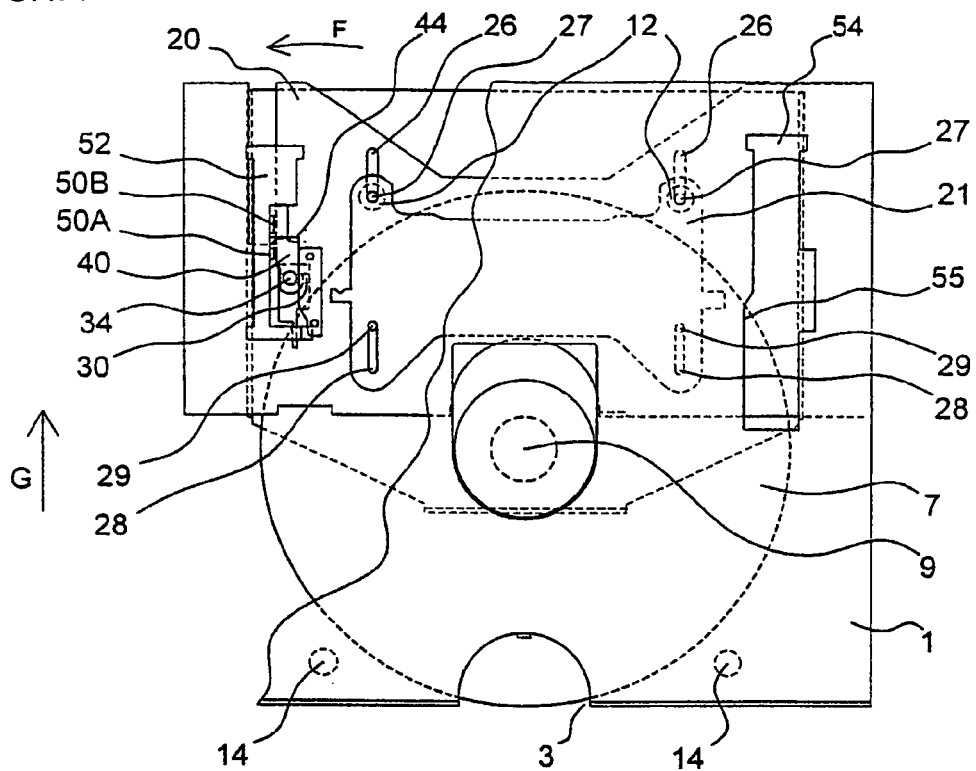
FIG. 1A is a partial top view of an apparatus incorporating a transfer device according to the present invention similar to FIG. 1 (but in somewhat smaller scale) with the information carrier being a bare disc.

The setting of the hooks 42 is such that they are locked on the projections 50A, 50B when the mobile frame 20 is shifted in the direction of the arrow G (FIGS. 1 to 2, 4, 6). The pivoting shafts 34 of the feelers are located in-between the hooks 42 and their driving mechanism, that is to say the mobile frame 20. Moreover, each ratchet 40 includes a substantially vertical leg 44 (FIG. 8) protruding of openings 54 provided in the fixed frame 1 (FIGS. 1, 1A) and of a profile which locks said leg 44 to prevent any pivoting of the ratchets 40 and thus to ensure the effective locking of the hooks 42 on the projections 50A, 50B in case of vibration or shock.

Thus, the feelers 32 and the ratchets 40 ensure the synchronization between the transfer of the information carriers 5, 7 and the means ensuring their setting in operative position, in the illustrated embodiment, the clamping 63 and driving 65 mechanisms, by utilizing a single mechanism requiring no particular care or manipulation from the user.

During the ejection or the unloading of an information carrier 7 having a small thickness—e.g., a bare disc—, the sliders 52 are shifted in synchronism with the rack 22 in the direction opposite to that of the arrow G. The profile of the hooks 42 is such that the force imparted by the mobile frame 20 on the ratchets 40 tends to pivot them in the direction opposite to that of the arrow F for disengaging them from the projections 50A. However, this movement is opposed by the profile of the openings 54 locking the leg 44 of the ratchet 40 for preventing any pivoting. Said carrier 7 is then totally free from its clamping 63 and driving 65 mechanisms. Simultaneously, the clearance 55, provided in the profile of each opening 54 (FIGS. 1 to 2), unlocks the leg 44, thus allowing the ratchet 40 to pivot around the shaft 34 and , as a result, the hooks 42 to disengage from the projections 50A. The ratchets 40 are then disconnected from the sliders 52. The mobile frame 20, powered by the rack 22, allows the information carrier 7, supported by the pairs of rollers 12, 14, to be ejected from the apparatus for being picked-up by its central hole 9. Once the carrier has been removed, the feelers 32 remain pivoted in their lower position under the action of their resilient elements. Thus, the ratchets 40 stay at their higher position, ready for the insertion of an imformation carrier 5 or 7.

Upon the unloading of an information carrier 5 of a larger thickness—e.g., a cartridge—, the sliders 52 are shifted in sync with the rack 22 in the direction opposite to that of the arrow G. In the same way, the profile of the hooks 42 enables the traction effort generated by the mobile frame 20 to pivot said hooks in the direction opposite to that of the arrow F to disengage them from the projections 50B. However, this movement is opposed again by the profile of each opening 54 locking the leg 44 of the ratchets 40. Said carrier 5 is then totally free from its clamping 63 and driving 65 mechanisms. Simultaneously, the clearance 55, provided in the profile of each opening 54, unlocks the legs 44, allowing the hooks 42 to disengage from the projections 50B and thus the ratchets 40 to pivot and move away from the sliders 52. The mobile frame 20, powered by the rack 22, allows the information carrier 5, supported by the pairs of rollers 12, 14, to be ejected from the apparatus for being picked-up by its central hole 9. The feelers 32, once the carrier 5 has been removed, pivot counterclockwise towards their lower position under the action of their own resilient elements, as a result, the ratchets 40 are set at their higher position, ready for the insertion of an information carrier 5 or 7.

REFERENCE NUMBERS 1 fixed frame
2 lateral walls
3 opening
5,7 information carrier
9 central hole of 5, 7
12, 14 mobile rollers
20 mobile frame
21 sub-frame
22 rack 24 gears train
26 groove
27 shaft
28 groove
29 stud
30 support element, shaft
32 detection mechanism/feeler
34 shaft
40 linking element/ratchet
41 resilient element/leaf spring
42 profile/hook
44 leg
50A, 50B projection
52 slider
54 opening
55 clearance
56, 57 groove
60, 61 stud
63 clamping mechanism
64 magnet
65 driving mechanism
66 motor
67 turntable

What is claimed is:

1. A transfer device for information carriers of different sizes comprising:
   a mobile frame for ensuring the transfer of an inserted information carrier, the mobile frame cooperating with a slider that ensures the setting of the inserted information carrier in an operative position;
   a detection mechanism cooperating with the inserted information carrier;
   a mobile linking element associated with the detection mechanism; and
   a plurality of projections provided on the slider, the projections being arranged at spaced-apart positions corresponding to the different sizes of information carriers, the mobile linking element cooperating with the projections to establish a connection between the mobile frame and the slider to ensure the transfer and the setting in operative position of the information carrier.

2. A transfer device according to claim 1, wherein the detection mechanism comprises feelers that pivot around support elements supported by the mobile frame.

3. A transfer device according to claim 2, wherein the linking element pivots in a plane substantially perpendicular to the plane in which the detection mechanism pivots.

4. A transfer device according to claim 1, wherein the linking element includes ratchets that are movable relative to the detection mechanism.

5. A transfer device according to claim 4, wherein the linking element includes a pivoting shaft and hooks and the pivoting shaft is located between the hooks and the mobile frame.

6. A transfer device according to claim 1, wherein the slider supports the projections located at spaced-apart positions.

7. A transfer device according to claim 1, wherein the linking element bears a leg that is arranged substantially vertically.

8. A transfer device according to claim 7, wherein a fixed frame includes openings having a profile that locks the leg to prevent any pivoting of the linking element.

9. A transfer device according to claim 8, wherein a clearance is provided in the profile of each opening to unlock the leg and thus let the linking element disengage from the projections.

* * * * *